United States Patent
Marchini et al.

(10) Patent No.: US 10,792,875 B2
(45) Date of Patent: Oct. 6, 2020

(54) PROCESS AND PLANT FOR BUILDING TYRES FOR VEHICLE WHEELS

(71) Applicant: PIRELLI TYRE S.P.A., Milan (IT)

(72) Inventors: Maurizio Marchini, Milan (IT); Sergio Sacchi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 262 days.

(21) Appl. No.: 15/538,535

(22) PCT Filed: Nov. 18, 2015

(86) PCT No.: PCT/IB2015/058916
§ 371 (c)(1),
(2) Date: Jun. 21, 2017

(87) PCT Pub. No.: WO2016/108098
PCT Pub. Date: Jul. 7, 2016

(65) Prior Publication Data
US 2017/0368773 A1    Dec. 28, 2017

(30) Foreign Application Priority Data

Dec. 29, 2014 (IT) .............................. MI2014A2260

(51) Int. Cl.
*B29D 30/00* (2006.01)
*B29D 30/26* (2006.01)
(52) U.S. Cl.
CPC ......... *B29D 30/0016* (2013.01); *B29D 30/26* (2013.01); *B29D 30/2607* (2013.01); *B29D 2030/0033* (2013.01)
(58) Field of Classification Search
CPC .... B29D 30/0016; B29D 30/08; B29D 30/10; B29D 30/20; B29D 30/26; B29D 30/2607;
(Continued)

(56) References Cited

U.S. PATENT DOCUMENTS 3,388,024 A    6/1968   Black et al.
4,039,365 A    8/1977   Takasuga et al.
(Continued)

FOREIGN PATENT DOCUMENTS

CN    1694796 A    11/2005
CN    102300700 A    12/2011
(Continued)

OTHER PUBLICATIONS

Notification of the First Office Action dated Jan. 18, 2019, from the State Intellectual Property Office of the People's Republic of China, in counterpart Chinese Application No. 201580070124.X.
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A plant for building tyres for vehicle wheels, includes a sleeve building area in which devices for obtaining carcass sleeves operate, a crown building area in which devices for obtaining crown structures operate and a shaping station for shaping each carcass sleeve according to a toroidal configuration. Transfer devices for transferring the carcass sleeves from the sleeve building area to the shaping station, by a first translator configured for picking up each carcass sleeve from an outlet station of the sleeve building area, a second translator configured for releasing each carcass sleeve in the shaping station, and a storage device operatively interposed between said first translator and second translator.

16 Claims, 5 Drawing Sheets

(58) Field of Classification Search
CPC .... B29D 2030/0022; B29D 2030/0033; B29D 2030/0038; B29D 2030/005
USPC .................................................. 156/110, 111
See application file for complete search history.

(56) References Cited

U.S. PATENT DOCUMENTS

| | | | |
|---|---|---|---|
| 4,452,655 A | 6/1984 | Pollard | |
| 4,732,640 A | 3/1988 | Goodfellow | |
| 6,139,668 A | 10/2000 | Stokes et al. | |
| 2004/0238102 A1 | 12/2004 | Girard et al. | |
| 2006/0108051 A1* | 5/2006 | Lacagnina | B29D 30/0016 156/111 |
| 2006/0219348 A1 | 10/2006 | Girard et al. | |
| 2007/0068617 A1* | 3/2007 | De Paoli | B29D 30/0016 156/111 |
| 2011/0290403 A1* | 12/2011 | D'ambrosio | B29D 30/005 156/111 |
| 2013/0213558 A1* | 8/2013 | Marchini | B29D 30/0016 156/111 |
| 2016/0121568 A1 | 5/2016 | Iyanagi et al. | |

FOREIGN PATENT DOCUMENTS

| | | |
|---|---|---|
| CN | 103298604 A | 9/2013 |
| DE | 1 181 901 | 11/1964 |
| EP | 1 000 733 A1 | 5/2000 |
| EP | 1 481 791 A2 | 12/2004 |
| GB | 2 148 211 A | 5/1985 |
| WO | WO 20048041520 A1 | 5/2004 |
| WO | WO 2010/070374 A1 | 6/2010 |
| WO | WO 2011/077236 A1 | 6/2011 |
| WO | WO 2012/063153 A1 | 5/2012 |
| WO | WO 2014/196246 A1 | 12/2014 |

OTHER PUBLICATIONS

International Search Report form the European Patent Office in corresponding International Application No. PCT/IB2015/058916 filed Jun. 15, 2016.
Written Opinion of the International Searching Authority from the European Patent Office in corresponding International Application No. PCT/IB2015/058916, dated Jun. 15, 2016.
Notification of the Second Office Action dated Jun. 6, 2019, from China National Intellectual Property Administration, in counterpart Chinese Application No. 201580070124.X.
Decision to Grant from the Russian Federation in Application No. 2017126140, dated Nov. 18, 2019.
Office Action issued from the Brazilian Patent Office in Application No. BR112017013477 dated Mar. 30, 2020.
Notification of the Third Office Action dated Nov. 4, 2019, from China National Intellectual Property Administration, in counterpart Chinese Application No. 201580070124.X.

* cited by examiner

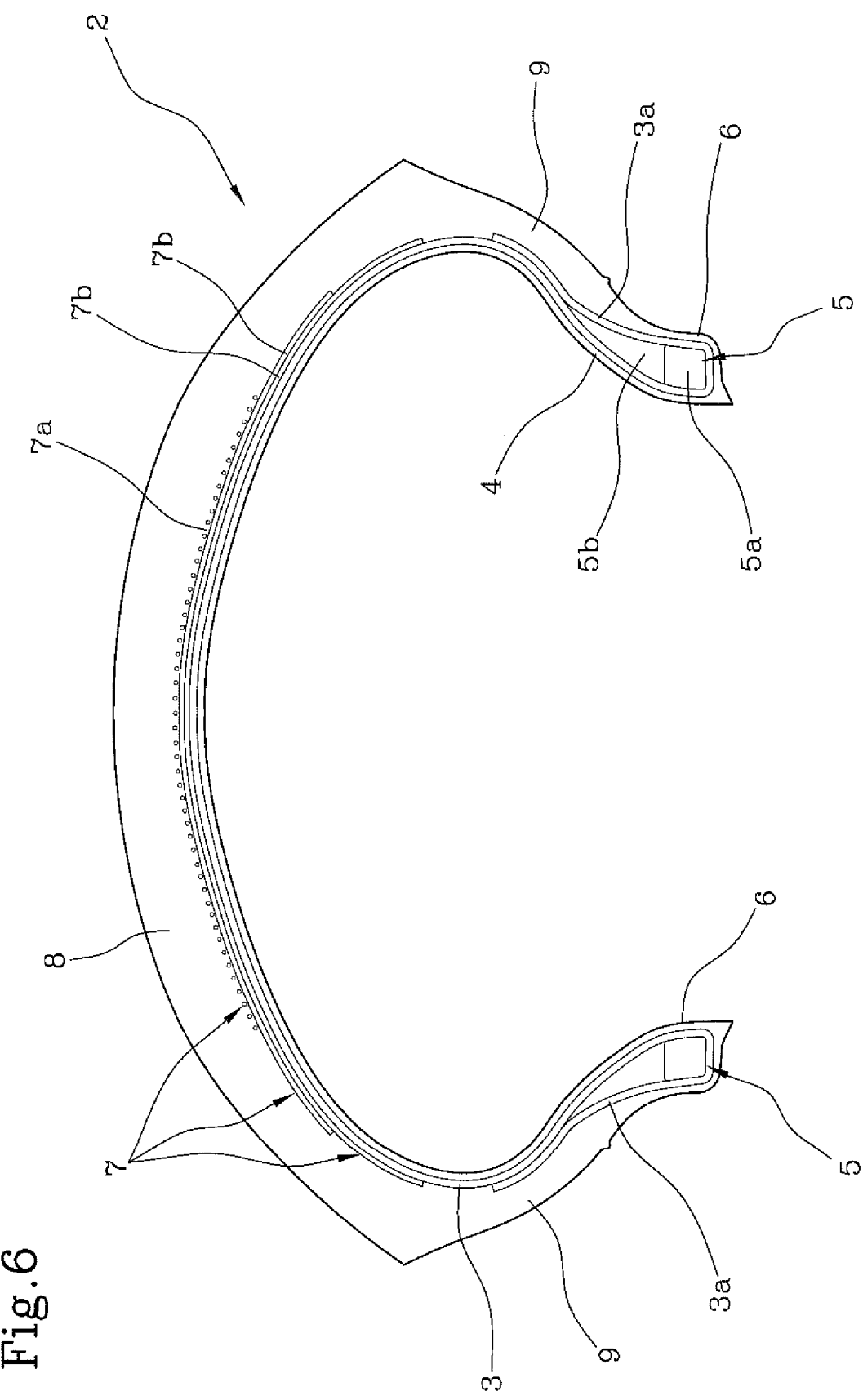

PROCESS AND PLANT FOR BUILDING TYRES FOR VEHICLE WHEELS

CROSS REFERENCE TO RELATED APPLICATIONS

This application is a national phase application based on PCT/IB2015/058916, filed Nov. 18, 2015, and claims the priority of Italian Patent Application No. MI2014A002260, filed Dec. 29, 2014, the content of each application being incorporated herein by reference.

BACKGROUND OF THE INVENTION

Field of the Invention

The present invention relates to a process and a plant for building tyres for vehicle wheels.

More particularly, the invention is intended for the building of green tyres, to be subsequently subjected to a vulcanisation cycle for obtaining the final product.

Description of the Related Art

With the term "elastomeric material" it is intended to indicate a composition comprising at least one elastomeric polymer and at least one reinforcement filler. Preferably, such composition also comprises additives, such as a cross-linking agent and/or a plasticising agent. Due to the presence of the cross-linking agent, such material can be cross-linked by means of heating so as to form the final manufactured product.

The terms "radial" and "axial" and the expressions "radially internal/external" and "axially internal/external" are used by referring to the radial direction of the used forming drum/of the tyre (i.e. to a direction perpendicular to the rotation axis of the aforesaid forming drum/tyre) and to the axial direction of the used forming support/of the tyre (i.e. to a direction parallel to the rotation axis of the aforesaid forming drum/tyre). The terms "circumferential" and "circumferentially" are instead used by referred to the annular extension of the aforesaid forming support/tyre.

A tyre for vehicle wheels generally comprises a carcass structure comprising at least one carcass ply having respectively opposite ends engaged with respective anchoring annular structures, integrated in the zones normally identified with the name "beads", having an internal diameter substantially corresponding to a so-called "fitting diameter" of the tyre on a respective mounting rim.

The carcass structure is associated with a belt structure that can comprise one or more belt layers, situated in radially superimposition with respect to each other and with respect to the carcass ply, having textile or metallic reinforcement cords with cross orientation and/or substantially parallel to the circumferential extension direction of the tyre (at 0 degrees). A tread band is applied in radially external position with respect to the belt structure; such tread band is also made of elastomeric material, like other components constituting the tyre.

Respective sidewalls made of elastomeric material are also applied in axially external position on the lateral surfaces of the carcass structure, each extended from one of the lateral edges of the tread band to the respective anchoring annular structure to the beads. In the tyres of "tubeless" type, a covering layer impermeable to air, normally termed "liner", covers the internal surfaces of the tyre.

Following the building of the green tyre actuated by means of assembly of respective components, a moulding and vulcanisation treatment is generally executed, aimed to cause the structural stabilisation of the tyre by means of cross-linking of the elastomeric compositions as well as to impress on the same, if requested, a desired tread design and possible distinctive graphic marks at the sidewalls of the tyre.

The carcass structure and the belt structure are generally obtained separately from each other in respective building areas, in order to be mutually assembled at a later time.

More particularly, the obtainment of the carcass structure first provides that the carcass ply or plies are applied on a building drum, to form a so-called "carcass sleeve" that is substantially cylindrical. The anchoring annular structures to the beads are fit or formed on the opposite terminal flaps of the carcass ply or plies, which are subsequently turned up around the annular structures themselves in a manner so as to enclose them in a kind of loop.

On a second drum or auxiliary drum, a so-called "crown structure" is obtained in the form of an external sleeve comprising one or more belt layers applied in mutual radial superimposition, and possibly the tread band applied in a radially external position with respect to the belt layer(s).

The crown structure is then picked up by the auxiliary drum in order to be coupled to the carcass sleeve. The crown structure is for such purpose arranged coaxially around the carcass sleeve, after which the carcass ply or plies are shaped according to a toroidal configuration by means of mutual axial approaching of the beads and simultaneous introduction of pressurized fluid inside the carcass sleeve, so as to cause a radial dilation of the carcass plies until they are adhered against the internal surface of the crown structure.

The assembly of the carcass sleeve with the crown structure can be actuated on the same drum used for obtaining a carcass sleeve, in which case one speaks of "single-stage building process" or "unistage process". Building processes are also known of so-called "two-step" type, in which a so-called "first-step drum" is employed for making the carcass sleeve, while the assembly between the carcass sleeve and crown structure is actuated on a so-called "second-step drum" or "shaping drum", on which the carcass sleeve picked up from the first-step drum and, subsequently, the crown structure picked up from the auxiliary drum are transferred.

The document U.S. Pat. No. 4,732,640 describes the use of towers rotatable on vertical axes, cooperating with each other for sequentially transferring a semi-finished product between different work stations in order to obtain a carcass sleeve provided with liner, carcass ply and reinforcement annular structures to the beads.

The document U.S. Pat. No. 3,388,024 describes a building apparatus in which a plurality of building drums are moved through work stations distributed along a conveyance system, in order for each to receive the components of a respective tyre being processed. Along the conveyance system, a pair of towers operates that are rotatable on respective vertical axes, each having four stations for loading respective drums. In each tower, each drum loaded on one of the loading stations is sequentially transferred according to a stepping movement through respective work stations, comprising a pair of loading-unloading stations, a station for heating the semi-finished product and a station for applying a reinforcement annular structure of the respective bead.

The document U.S. Pat. No. 6,139,668 describes an apparatus for building tyres, in which three towers, rotatable according to respective horizontal axes, each carry a pair of drums alternately positionable at a pair of work stations. More particularly, a first tower supports a first and a second drum, coupled with a station for applying carcass plies and reinforcements and a station for applying liners and sidewalls. A second tower supports a third and a fourth drum, coupled with a station for laying down belt layers and a station for applying a tread band. A third tower, positioned in relation of alignment between the first and second tower, supports a fifth and a sixth drum, paired to a shaping station in which the carcass sleeve is coupled to the belt-tread band assembly, and a rolling station.

Two transfer units each provide for removing the semi-finished product from one of the drums carried to one of the towers, in order to transfer it onto one of the drums carried by the adjacent tower.

SUMMARY OF THE INVENTION

The Applicant has observed that, in the prior art, undesired drops of productivity can occur due to occasional stops of production in the area dedicated to building the carcass sleeves and/or in the area dedicated to building the crown structures. In particular, the Applicant has verified that a temporary stop of production at any one of the sleeve or crown building areas—e.g. due to malfunction or failure, or to allow setting operations when variations in the size or model of tyres under production are requested—necessarily involves the stop of production along the entire plant. Indeed, if the production of the carcass sleeves is stopped, the absence of carcass sleeves to be coupled to the new crown structures (in the meantime produced) forces a suspension of the production also in the crown building area. For similar reasons, a stop of the production in the area dedicated to building the crown structures forces a stop of the production of the carcass sleeves.

The Applicant has therefore perceived the possibility to advantageously increase the productivity, ensuring that the production in each of the areas respectively dedicated to the building of carcass sleeves and crown structures does not have to be suspended with each stop of the production in the other area, exploiting the suitable arrangement of a storage device. The Applicant has therefore found that by arranging a storage device immediately upstream of a station set for shaping each carcass sleeve according to a toroidal configuration—said storage device having a loading and picking up geometry such that said actions are obtained in positioned angularly spaced from each other around a rotation centre of the carcass sleeves carried by the storage device—it becomes possible to arrange a supply of carcass sleeves, associable with respective crown structures produced during occasional production stops in the carcass sleeve building area. Finally, the plant improves its reliability in case of stoppage during building both of the carcass sleeves and the crown structures.

More particularly, according to a first aspect, the present invention relates to a process for building tyres for vehicle wheels.

It is preferably provided that carcass sleeves obtained in a sleeve building area are transferred to a shaping station where each carcass sleeve is shaped according to a toroidal configuration. Preferably, each shaped sleeve is associated with a respective crown structure obtained in a crown building area.

Preferably, each carcass sleeve picked up from the sleeve building area, before being carried to the shaping station, transits through a storage device arranged to receive a plurality of said carcass sleeves.

Preferably, each carcass sleeve is engaged on the, and picked up from the, storage device respectively at a load station and a pick-up station, angularly spaced from each other around a rotation centre of the carcass sleeves carried by the storage device.

In accordance with a second aspect, the invention relates to a plant for building tyres for vehicle wheels.

Provision is preferably made for a sleeve building area in which devices for obtaining carcass sleeves operate.

Provision is preferably made for a crown building area in which devices for obtaining crown structures operate.

Provision is preferably made for a shaping station for shaping each carcass sleeve according to a toroidal configuration.

Provision is preferably made for transfer devices for transferring the carcass sleeves from the sleeve building area to the shaping station.

Preferably, said transfer devices comprise a first translator configured for picking up each carcass sleeve from an outlet station of the sleeve building area and transferring it to a load station at a storage device.

Preferably, said transfer devices also comprise a second translator configured for transferring each carcass sleeve from a pick-up station at said storage device to the shaping station.

Preferably said storage device is operatively interposed between said first translator and second translator.

Preferably the load station and the pick-up station are angularly spaced from each other around a rotation centre of the carcass sleeves carried by the storage device.

The Applicant thus deems it possible to attain significant increases in productivity. The use of a storage device operatively interposed between the sleeve building line and shaping station in fact allows arranging a supply of carcass sleeves employable for feeding the shaping station in case of temporary production stops in the sleeve building area, for example due to failures or in case of settings to be executed when variations are requested of the size and/or model of the tyres being processed. The processing in the work station and in the crown building area can therefore continue without interruption, until the depletion of the carcass sleeves previously stored in the storage device. At the same time, the storage device is also adapted to store carcass sleeves produced during occasional production stops in the shaping station and/or in the crown building area, allowing the continuation of the processing with no interruptions in the sleeve building area. The Applicant also deems that the use of a rotary device allows an improved design flexibility in terms of plant layout, the angular orientation presented by each carcass sleeve being unconstrained respectively in the sleeve building area and in the shaping station. A storage device of limited size is also obtained, capable of supporting the carcass sleeves without damaging them.

In at least one of the aforesaid aspects, the invention can also comprise one or more of the following preferred features.

Preferably, each carcass sleeve is engaged with the storage device by means of insertion of a support element in said carcass sleeve.

It is thus possible to limit the travel, and consequently the bulk, required by the respective translator to reach the respective load or pick-up station. It therefore becomes possible to limit the size of the storage device, since both the first and second translator can interact with the latter without interfering with each other.

Preferably, the insertion of the support element is preceded by an action of alignment of the carcass sleeve, with its geometric axis substantially aligned with the support element.

The carcass sleeve can therefore be picked up from the sleeve building area in an outlet station that is not aligned with the support element positioned in the load station, improving design flexibility of the plant as a function of the layout requirements.

Preferably, the insertion of the support element is executed by means of longitudinal translation of the support element parallel to a geometric axis of the carcass sleeve.

Preferably, each carcass sleeve picked up from the sleeve building area is moved towards the storage device along a first transfer path lying in a vertical plane.

It is thus possible to attain a reduction of the ground bulk of the plant. Preferably, the lying plane of the first transfer path is aligned with a load station of the storage device.

Preferably, each carcass sleeve is picked up from the storage device and moved towards the shaping station along a second transfer path lying in a vertical plane.

It is thus possible to obtain a reduction of the ground bulk of the plant. Preferably, the lying plane of the second transfer path is aligned with a pick-up station of the storage device.

Preferably, the lying planes of the first and second transfer path are respectively orthogonal.

The shaping station can thus be arranged within the crown building area, with consequent compaction of the production plant.

Preferably, the second transfer path is extended substantially according to an L-shaped configuration above the shaping station.

Also this solution allows an advantageous reduction of the plan bulk of the plant.

Preferably, the first transfer path is extended substantially astride a service area configured for being occupied by an operator.

It is therefore possible to limit the bulk of the plant without the transit of the carcass sleeves involving risks for the operator who oversees the service area.

Preferably, said storage device has at least one manual loading station accessible from said service area.

If necessary, one or more carcass sleeves can then be loaded on the storage device in order to anticipate or make up for possible temporary stops of the production in the sleeve building area.

Preferably, each carcass sleeve picked up from the sleeve building area, before being moved along the first transfer path, is translated from an outlet station to an alignment position respectively offset along a direction orthogonal to the lying plane of the first transfer path.

The carcass sleeve can therefore be picked up from the sleeve building area in an outlet station that is not aligned with the support element positioned in the load station.

Preferably, each carcass sleeve picked up from the sleeve building area is supported by means of an action of radial containment distributed over an external surface thereof.

It is thus possible to carry out a reliable gripping action without risking the damaging or twisting of the carcass sleeve.

Preferably, each carcass sleeve picked up from the storage device is supported by means of an action of radial containment distributed over an external surface thereof.

Preferably, in the shaping station a forming drum is internally coupled to each shaped carcass sleeve.

Due to the use of the forming drum, the crown structure can be directly formed on the shaped carcass sleeve, without having to be separately obtained.

Preferably, each forming drum coupled to the carcass sleeve is picked up from the shaping station and transferred into the crown building area in order to obtain said crown structure.

The shaping station is thus available for a new work cycle on a new carcass sleeve, without having to wait for the obtainment of the crown structure.

Preferably, each built tyre is removed from the forming drum engaged in the shaping station, after obtaining the crown structure.

The forming drum is thus available for receiving a new carcass sleeve. Meanwhile, the built tyre can be easily transferred into the service area.

Preferably, each tyre removed from the forming drum is transferred into the service area.

Preferably, the storage device has a plurality of support elements simultaneously translatable around a common rotation centre.

Preferably, each support element can be selectively positioned at least at said load station and said pick-up station.

Preferably, the load station and the pick-up station are angularly spaced by 90° around the rotation centre.

Preferably, said storage device comprises movement members operating at at least one of said load station and pick-up station, in order to translate each support element between an extracted condition in which it is radially moved away from the rotation centre and a contracted condition in which it is moved close to the rotation centre.

Preferably, said movement members comprise a slide guide extended around the rotation centre.

Preferably, said slide guide is extended eccentrically with respect to the rotation centre.

The advancing of the support element towards the extracted condition can therefore be obtained simultaneously with the translation of the support elements around the rotation centre.

Preferably, said slide guide is slidably engaged by sliders, each carried by one of said support elements.

Preferably, each support element is slidably engaged on a radial arm extended from a rotatable support coaxial with the rotation centre.

Preferably, said movement members comprise an actuator operating on a pusher that is radially movable with respect to the rotation centre.

A possibly additional movement of the support element towards the load station can thus be attained.

Preferably, a portion of the slide guide is obtained in said pusher.

An integrated coexistence of the movements, respectively attained by means of the slide guide and the actuator, is therefore obtained.

Preferably, said first translator comprises a first grip member movable along a vertical direction and along a horizontal direction along a first transfer path lying in a vertical plane.

Preferably, said first translator comprises: a first guide beam extended horizontally in raised position between the sleeve building area and the storage device; a first carriage movable along the first guide beam; a first column slidably engaged with the first carriage and vertically movable; a first grip member engaged in proximity to a lower end of the first column.

It is thus possible to prevent the first translator and the carcass sleeve carried thereby from interfering with equipment or other objects or other people below.

Preferably, the lying plane of the first transfer path is aligned with a load station of the storage device.

Preferably, said second translator comprises a second grip member mobile in a vertical direction and a horizontal direction along a second transfer path lying in a vertical plane. Preferably, said second translator comprises: a second guide beam extended horizontally in raised position with respect to the storage device and above the shaping station; a second carriage movable along the second guide beam; a second column slidably engaged with the second carriage and vertically movable; a second grip member engaged in proximity to a lower end of the second column.

It is thus possible to prevent the second translator and the carcass sleeve carried thereby from interfering with equipment or other objects or people below.

Preferably, the lying plane of the second transfer path is aligned with a pick-up station of the storage device.

Preferably, the lying planes of the first and second transfer path are respectively orthogonal.

Preferably, the storage device is arranged in raised position with respect to the shaping station.

Preferably, the sleeve building area and the crown building area are respectively side-by-side according to a direction parallel to the lying plane of the first transfer path, within a rectangular perimeter line.

A rationalized use of the spaces normally available in a rectangle-plan industrial building is therefore attained.

Preferably a service area, configured for being occupied by at least one operator, is internally arranged along one side of said perimeter line and delimited between said sleeve building area and crown building area.

Preferably, the shaping station is positioned within the crown building area. Preferably, the first guide beam is extended above a service area configured for being occupied by an operator.

Preferably, each support element can also be positioned at at least one manual loading station.

Preferably, the first grip member is carried by an oscillating arm rotatably engaged in proximity to the lower end of the first column, according to an oscillation axis parallel to the first guide beam.

Preferably, at least one of said first grip member and second grip member comprises at least two shells, mutually approachable in order to exert an action of radial containment on an external surface of the carcass sleeve.

Preferably, each of said shells substantially has semi-cylinder shape.

Preferably, movement members and control units configured in order to translate the support elements around the rotation centre are mounted on fixed parts of the storage device, with no movement members and/or control units mounted on the support elements or other parts movable around said rotation centre.

This allows making the support elements carry out even multiple complete revolutions around the rotation centre in any one of the directions, clockwise or anticlockwise, without having to use rotary joints between the fixed parts of the tower and the movable parts. In addition, the storage device can be driven, according to requirements, both according to a so-called FIFO (First-In-First-Out) logic and according to a so-called LIFO (Last-In-First-Out) logic, so as to free the movement sequence of the support elements around the rotation centre from the movement sequence of the first and second translator.

Preferably, the plant also comprises forming drums that can be engaged in the shaping station, each within a respective shaped carcass sleeve.

Preferably, the crown building area comprises movement devices operating on the single forming drums in order to move the shaped carcass sleeves between second work stations distributed in the crown building area.

Preferably, the shaping station comprises unloading devices for removing each built tyre from the respective forming drum.

Provision is also preferably made for an unloading conveyor arranged in the service area in order to receive the built tyres from the unloading devices.

Further characteristics and advantages will be clearer from the detailed description of a preferred but not exclusive embodiment of a process for building tyres for vehicle wheels and a plant for building tyres for vehicle wheels, in accordance with the present invention.

BRIEF DESCRIPTION OF THE DRAWINGS

Such description will be set forth hereinbelow with reference to the enclosed drawings, provided only as a non-limiting example, in which:

FIG. 6 shows a tyre that can be obtained in accordance with the present invention, in interrupted radial section.

DETAILED DESCRIPTION OF THE INVENTION

Figure 1:
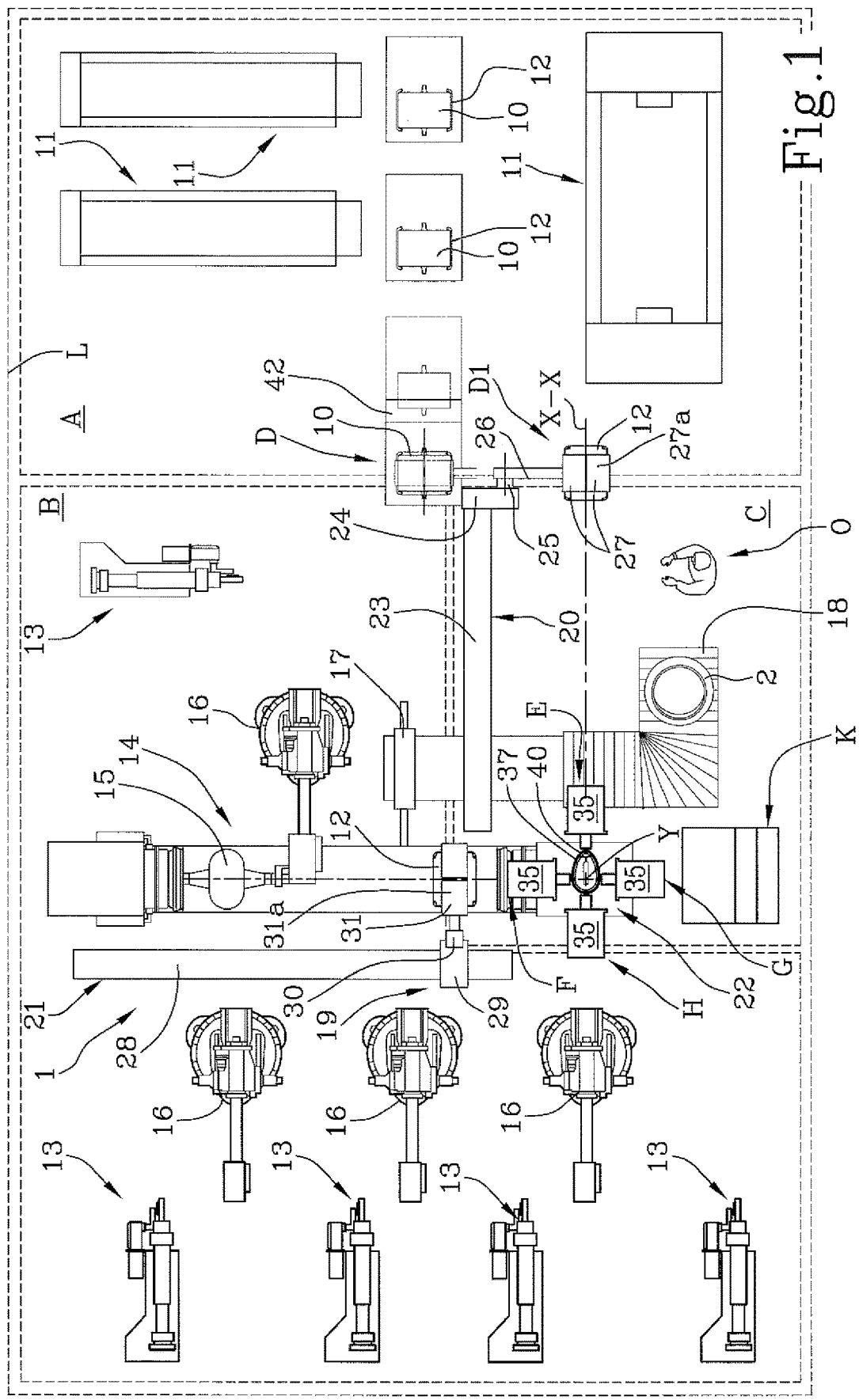
FIG. 1 schematically shows a top view of a plant for building tyres.
Figure 2:
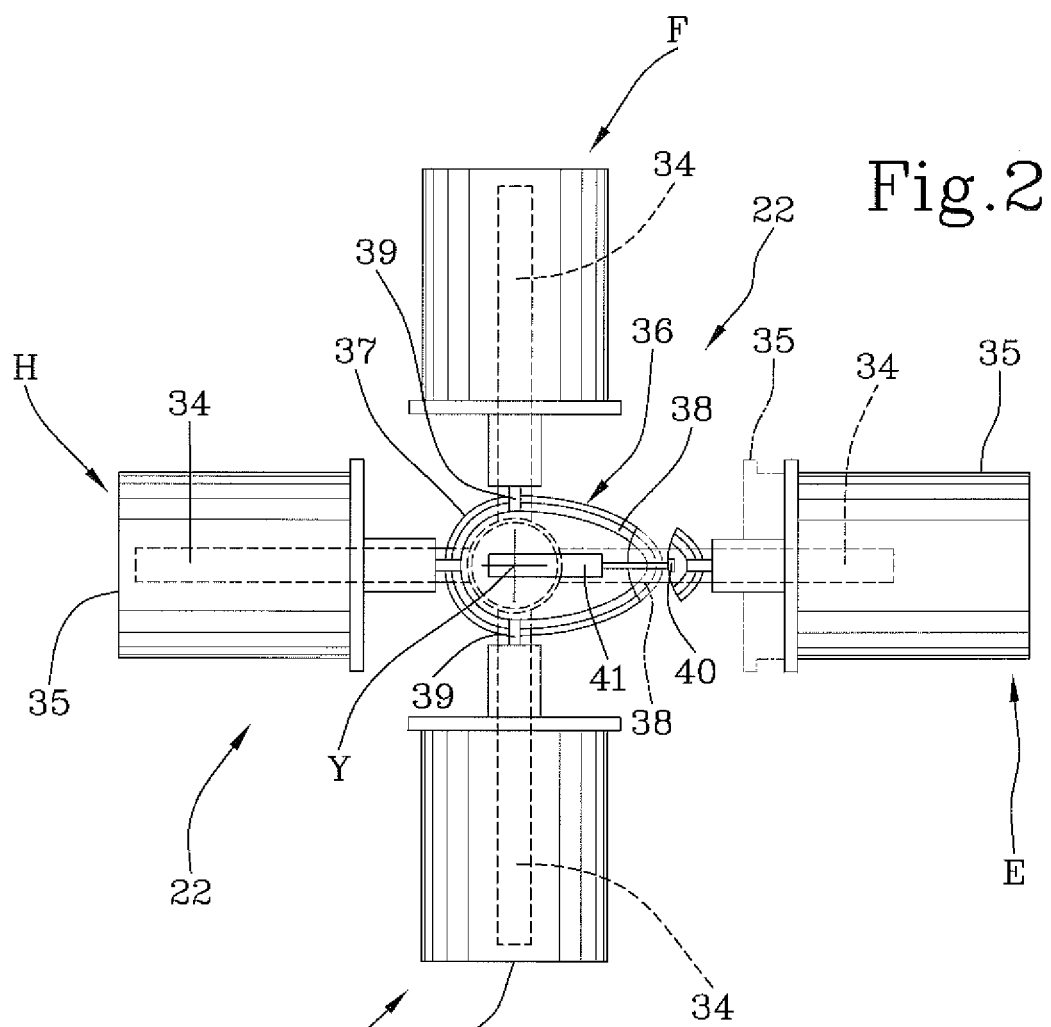
FIG. 2 shows a detail of FIG. 1 in enlarged scale.
Figure 3:
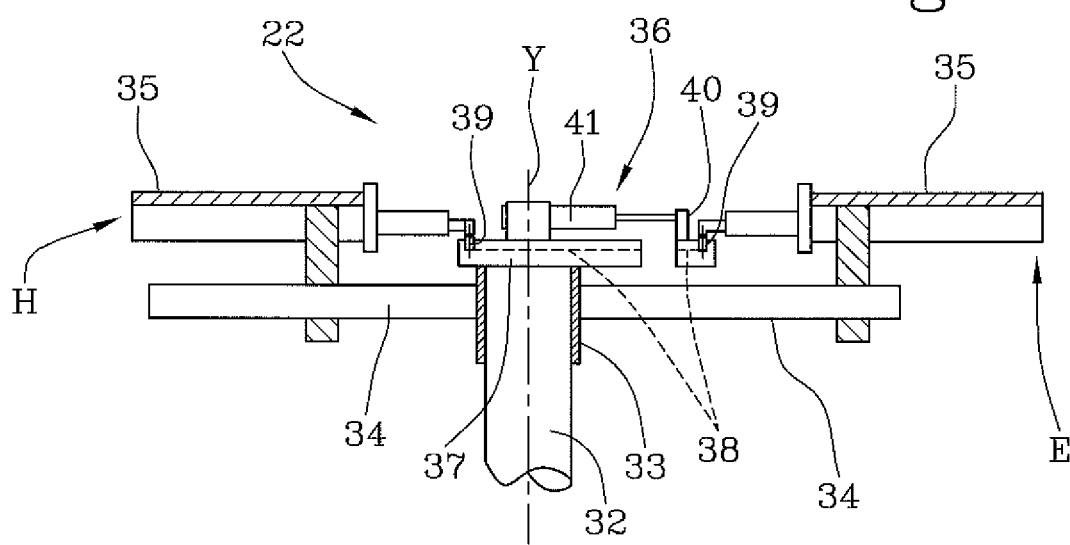
FIG. 3 laterally shows the detail of FIG. 2.
Figure 4:
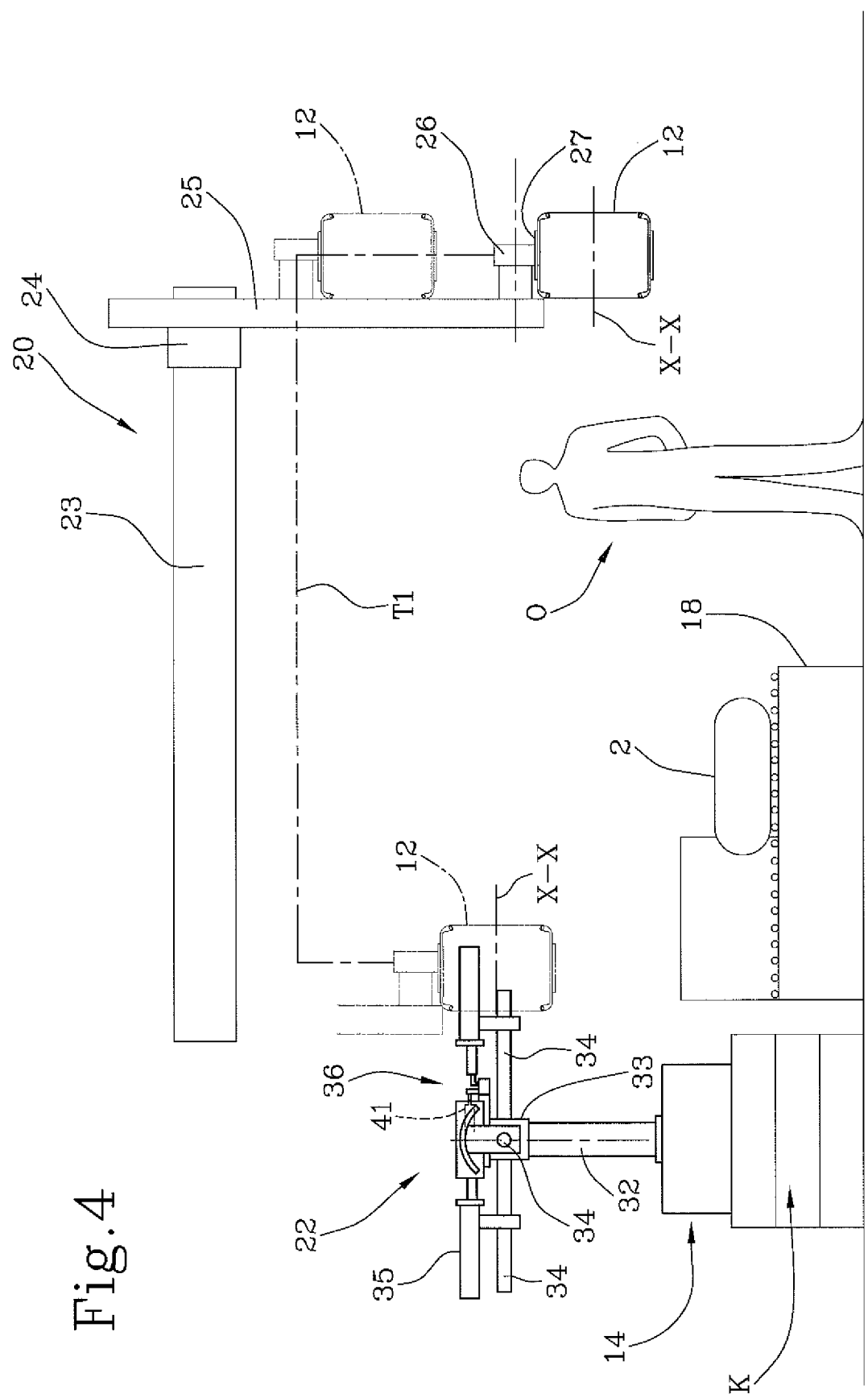
FIG. 4 shows a detail of the plant, indicating a first translator in side view.
Figure 5:
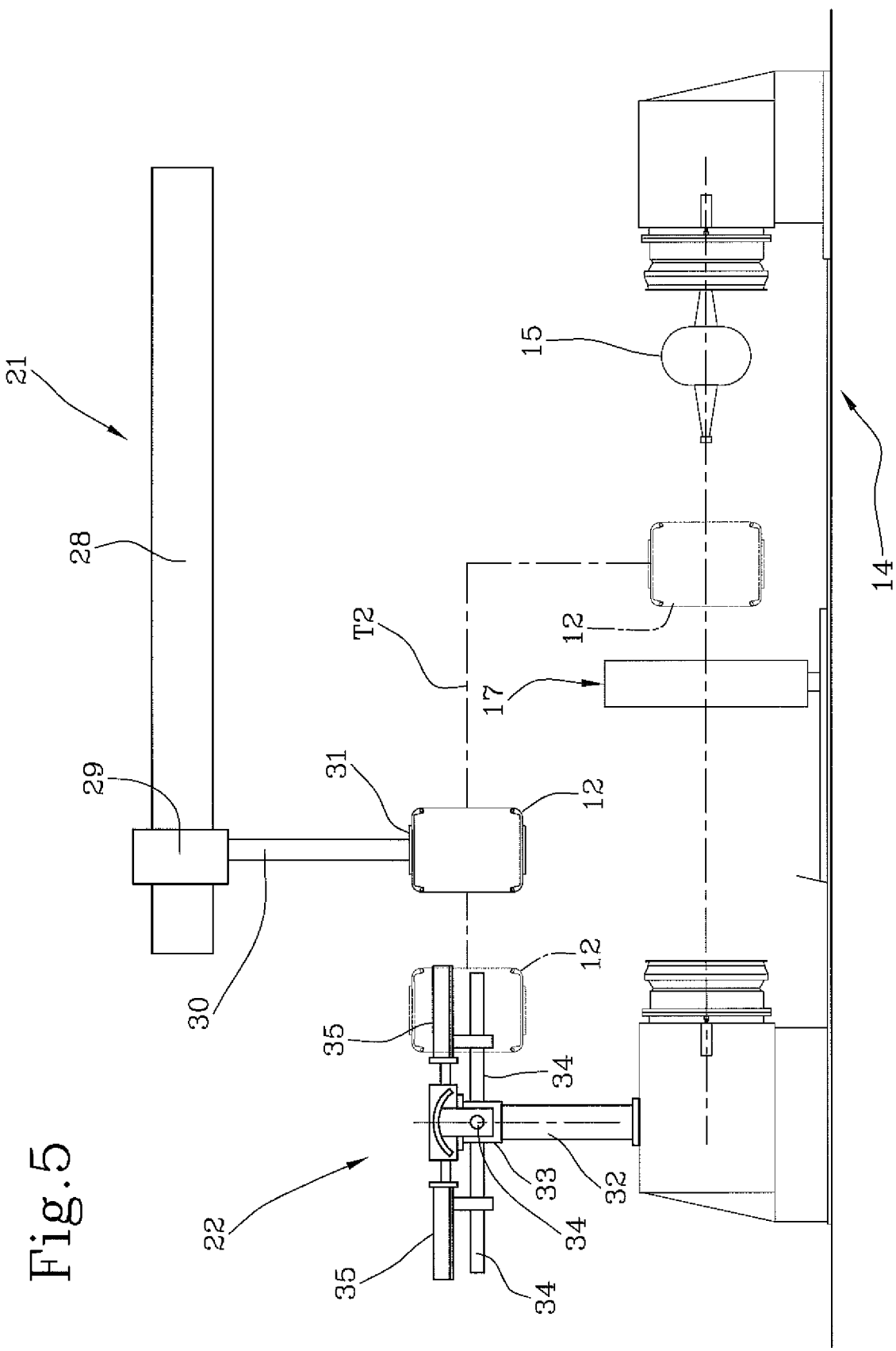
FIG. 5 shows a detail of the plant, indicating a second translator in side view.

With reference to the abovementioned figures, reference number 1 overall indicates a plant for building tyres for vehicle wheels. The plant 1 is arranged for actuating a process for building tyres for vehicle wheels, in accordance with the present invention.

The plant 1 is set for obtaining tyres 2 (FIG. 6) essentially comprising at least one carcass ply 3 preferably internally covered by a layer of impermeable elastomeric material or so-called liner 4. Two anchoring annular structures 5, each comprising a so-called bead core 5a preferably carrying an elastomeric filler 5b in radially external position, are engaged with respective end flaps 3a of the carcass ply/plies 3. The anchoring annular structures 5 are integrated in proximity to zones normally identified with the name "beads" 6, at which the engagement between the tyre 2 and a respective mounting rim (not depicted) normally occurs.

Around the carcass ply/plies 3, a crown structure 7 is circumferentially applied, for example comprising one or more belt layers 7a,7b and a tread band 8 circumferentially superimposed on the belt layers 7a,7b. Two sidewalls 9, each extended from the corresponding bead 6 to a corresponding lateral edge of the tread band 8, are applied in laterally opposite positions on the carcass ply/plies 3.

The plant 1 is preferably delimited within a preferably closed perimeter line L, having a rectangular-plan extension. Within the perimeter line L, a sleeve building area A and a crown building area B are identifiable, respectively side-by-side. The sleeve building area A and the crown building area B occupy a main portion, approximately comprised between 70% and 90%, of the surface inscribed in the perimeter line L. A service area C, configured for being occupied by at least one operator O, is internally arranged along one side of the perimeter line L, preferably in substantially central position, and delimited between the sleeve building area A and the crown building area B. In the illustrated example, the service area C occupies about 20%, approximately from 10% to 30%, of the surface inscribed in the perimeter line L.

In the sleeve building area A, one or more building drums 10 are moved according to a pre-established sequence, through a plurality of first work stations 11, e.g. according to known modes, in order to form on the building drum itself a carcass sleeve 12 having substantially cylindrical shape. The carcass sleeve 12 can for example comprise said at least one carcass ply 3, preferably internally covered by the liner 4, and having the respective axially opposite end flaps 3a engaged, e.g. by turning-up, with the respective anchoring annular structures 5. If necessary, the carcass sleeve 12 can also comprise the sidewalls 9 or first portions thereof, each extended starting from a respective bead 6.

In the crown building area B, second work stations 13 are distributed for obtaining the crown structures 7, and each of these can for example comprise the belt layer or layers 7a, 7b, the tread band 8 and possibly at least one part of the sidewalls 9.

It is provided that each carcass sleeve 12 is transferred into a shaping station 14 where, for example in a known manner, it can be shaped according to a toroidal configuration for the purpose of coupling with the respective crown structure 7.

In accordance with a non-illustrated embodiment, each crown structure 7 can be obtained on a respective auxiliary drum, from which it must be removed in order to be coupled to a respective carcass sleeve 12.

In accordance with a different preferred embodiment, each crown structure 7 can be advantageously obtained directly on the respective carcass sleeve 12.

For such purpose, provision is preferably made such that within each carcass sleeve 12 transferred into the shaping station 14, a forming drum 15 is engaged that is radially expandable within the shaped carcass sleeve 12.

The shaping station 14 can be situated inside the crown building area B. Movement devices 16, comprising for example anthropomorphic robotic arms, operate in the crown building area B in order to sequentially pick up, from the shaping station 14, each forming drum 15 coupled to the respective shaped carcass sleeve 12, and transfer it into the crown building area B, in order to sequentially move it through the second work stations 13. The different components of the crown structure 7 can therefore be obtained according to a desired sequence directly on the respective carcass sleeve 12, suitably shaped and adequately supported by the respective forming drum 15 for the purpose of obtaining the crown structure 7. Preferably, at the end of the work cycle in the crown building area B, each forming drum 15 carrying a respective built green tyre 2 is once again engaged in the shaping station 14. The forming drum 15 is then radially contracted in order to allow the removal of the built tyre 2, for example by an annular transferring device or other unloading devices 17 which remove the built tyre 2 in order to move it away from the shaping station 14. Preferably, each built tyre 2 is released on an unloading conveyor 18 arranged in the service area C.

Between the sleeve building area A and the shaping station 14, transfer devices 19 are operatively arranged, configured for separately and sequentially transferring the carcass sleeves 12 from the sleeve building area A to the shaping station 14.

The transfer devices 19 preferably comprise a first translator 20 configured for picking up each carcass sleeve 12 from an outlet station D of the sleeve building area A, a second translator 21 configured for releasing each carcass sleeve 12 in the shaping station 14, and a storage device 22 operatively interposed between the first translator 20 and the second translator 21.

The first translator 20 has a first guide beam 23 which is extended horizontally, in raised position above the service area C, between the sleeve building area A and the storage device 22. Along the first guide beam 23, a first carriage 24 is slidably engaged, through which a first vertically-movable column 25 is in turn slidably engaged.

In proximity to a lower end of the first column 25, an oscillating arm 26 is engaged, rotatably according to an axis parallel to the first guide beam 23; such oscillating arm 26 carries a first grip member 27 at one end thereof. The first grip member 27 preferably comprises at least two first shells 27a, mutually approachable in order to exert an action of radial containment on an external surface of the carcass sleeve 12. The first shells 27a preferably have semi-cylinder shape, so as to be adapted to engage the carcass sleeve 12, exerting an action of radial containment on the external surface thereof.

Suitable actuators, not illustrated, drive the controlled movement of the first carriage 24 along the first guide beam 23 and of the first column 25 through the first carriage 24, according to respectively perpendicular directions, in order to translate the first grip member 27 along a predetermined first transfer path T1, lying in a vertical plane preferably parallel to the direction of mutual side-by-side placement of said sleeve building area A and crown building area B.

The second translator 21 has a second guide beam 28 extended horizontally in raised position above the storage device 22 and the shaping station 14, preferably according to an orientation perpendicular to the first guide beam 23. Along the second guide beam 28, a second carriage 29 is slidably engaged, through which a vertically-movable second column 30 is in turn slidably engaged.

In proximity to a lower end of the second column 30, a second grip member 31 is engaged, comprising preferably at least two mutually-approachable second shells 31a. Also the second shells 31a preferably have semi-cylinder shape, so as to be adapted to engage the carcass sleeve 12, exerting an action of radial containment on the external surface thereof.

Suitable actuators, not illustrated, drive the controlled movement of the second carriage 29 along the second guide beam 28 and of the second column 30 through the second carriage 29, along respectively perpendicular directions, in order to translate the second grip member 31 along a pre-established second transfer path T2, lying in a vertical plane, preferably orthogonal with respect to the lying plane of the first transfer path T1.

The storage device 22, situated for example in proximity to one angle of the service area C adjacent to the crown building area B and close to the shaping station 14, preferably comprises a tower 32 defining a rotation centre Y along a vertical axis. The tower 32 carries a rotatable support 33 coaxial with rotation centre Y, from which a plurality of angularly-equidistant radial arms 34 are extended. Each radial arm 34 carries a respective support element 35 having an abutment surface on the upper part, with preferably convex shape.

In the illustrated embodiment, four radial arms 34 are provided, carrying respective support elements 35 angularly spaced 90° from each other. Upon command of an actuator, not illustrated, the rotatable support 33 of the tower 32 can be rotated so as to cause a simultaneous translation of the support elements 35 around the rotation centre Y, preferably according to one or more angular movement pitches having value corresponding to the angular distance between two respectively adjacent support elements 35.

Consequently, each support element 35 can be selectively positioned at least at a load station E reachable by the first translator 20, and a pick-up station F reachable by the second translator 21. Preferably, the load station E and the pick-up station F are angularly spaced by 90° around the rotation centre Y, each aligned with the lying plane of the respective first and second transfer path T1, T2. Provision is also preferably made for a manual loading station G, accessible from the service area C, and preferably arranged in a diametrically opposite position with respect to the pick-up station F. A possible transit station H can be situated in a position diametrically opposite the load station E, between the pick-up station F and the manual loading station G.

Preferably the storage device 22, and more precisely the support elements 35 carried by the respective radial arms 34, are situated in raised position with respect to the shaping station 14, but in any case such that the manual load station E can be easily reached by the operator O, possibly by means of a suitable ladder K arranged in the service area C.

The rotatable support 33 and the parts supported thereby, for example the radial arms 34 and the support elements 35, preferably lack motorised members or other components with electrical, hydraulic or pneumatic operation 2. In other words, movement members and control units configured in order to translate the support elements 35 around the rotation centre Y, not illustrated in the drawings, are mounted only on the tower 32 or other fixed parts of the storage device 22, with no movement members and/or control units mounted on the support elements 35 or other parts movable around the rotation centre Y.

For the first and the second translator 21 to be able to interact with the storage device 22 without mutually interfering, movement members 36 are preferably provided, operating at at least one of said load station E and pick-up station F, in order to translate each support element 35 between an extracted condition in which it is radially moved away from the rotation centre Y and a contracted condition in which it is moved close to the rotation centre Y. In the illustrated embodiment, the movement members 36 operate at the single load station E.

More particularly, a plate 37 is fixed close to the top of the tower 32. On one surface of such plate 37, a slide guide 38 is obtained that is extended eccentrically around the rotation centre Y, substantially according to a horizontal plane. For example, the slide guide 38 can be obtained from a groove extended according to a line closed around the rotation centre Y, and having a circular portion extended for about 180° concentrically around the rotation centre Y, and an eccentric portion extended towards the load station E.

Each support element 35 is slidably engaged along the respective radial arm 34 and, at an end directed towards the rotation centre Y, carries a slider 39, e.g. in roller form, slidably engaged along the slide guide 38.

The sliders 39 travel along the slide guide 38 during the rotation imposed on the support elements 35 around the rotation centre Y. The engagement between the sliders 39 and the slide guide 38 consequently forces a radial movement to the support element 35 which is moved closer to or away from the load station E. More particularly, during the movement towards the load station E, each support element 35 translates towards the respective extracted condition, in order to return towards the contracted condition when moving away from the load station E itself.

Additionally or as an alternative, for example in order to increase the distance of the load station E from the rotation centre Y, a portion of the slide guide 38 engaged by the slider 39 of each support element 35 at the load station E can be obtained in a pusher 40 that is radially movable away from the rotation centre Y, upon command of an actuator 41 fixed to the tower 32.

During the operation of the plant, the building drum or drums 10 carrying the carcass sleeves 12 obtained in the sleeve building area A are separately carried, for example by means of a handling device 42, to the outlet station D, preferably arranged along one side of the sleeve building area A adjacent to the crown building area B and/or to the service area C. The first translator 20 carries the respective first grip member 27 to the outlet station D, in a manner such that the carcass sleeve 12 is coaxially inserted inside the first grip member 27. With a mutual approaching of the first shells 27a, the carcass sleeve 12 is engaged by the first grip member 27 and can therefore be taken off the building drum 10, upon possible radial contraction thereof.

With a rotation of the oscillating arm 26, e.g. by about 180°, the carcass sleeve 12 retained by the first grip member 27 is carried from the outlet station D to an alignment position D1 parallel and offset with respect to the outlet station D, along a direction orthogonal to the lying plane of the first transfer path T1. Upon reaching the alignment position D1, the carcass sleeve 12 has its geometric axis X-X coplanar with the first transfer path T1.

The geometric axis X-X of each carcass sleeve 12 coincides with the rotation axis of the respective tyre 2 during production.

The presence of the oscillating arm 26 on the first translator 20 ensures that the outlet station D may if necessary not be aligned with the load station E on the storage device 22, so as to improve the design flexibility of the plant as a function of the needs.

The translation of the first column 25 and of the first carriage 24 is then driven, in order to move the carcass sleeve 12 along the first transfer path T1, extended preferably astride the service area C. More particularly, with a translation of the movable first column 25, a lifting of the carcass sleeve 12 is caused up to a height of at least 2100 mm, suitable for preventing risks of collision with the operator O present in the service area C. The movement of the first carriage 24 is then driven, which makes the carcass sleeve 12 carry out a horizontal translation along its geometric axis X-X, above the service area C. A new downward translation of the first column 25 causes an alignment of the carcass sleeve 12 in a manner such that its geometric axis X-X is aligned with the support element 35 arranged in the load station E. A new movement of the first carriage 24 and/or the movement of the support element 35 in the extracted condition is then driven upon command of the actuator 41, if not carried out above, in order cause the insertion of the support element itself within the carcass sleeve 12, parallel to the geometric axis X-X of the latter.

The first shells 27a can thus be moved away in order to free the carcass sleeve 12, setting it on the support element 35, after which the first grip member 27 is removed from the carcass sleeve 12, which remains engaged to the support element 35 in the load station E.

The support element 35 is brought back towards the contracted condition upon command of the actuator 41 and, with a translation of the support elements 35 around the rotation centre Y, according to an angle of 90° in anticlockwise sense with respect to the FIG. 1, the carcass sleeve 12 is transferred from the load station E to the pick-up station F.

Simultaneously, a possible additional carcass sleeve 12, manually loaded by the operator O, is transferred from the manual loading station G to the load station E, ready to be transferred to the pick-up station F with a new translation of the support elements 35 around the rotation centre Y.

The carcass sleeve 12 carried into the pick-up station F is engaged by the second grip member 31 carried by the translator 21, in a manner analogous to that stated with reference to the first grip member 27.

The carcass sleeve 12 is therefore adapted to be picked up from the storage device 22 and moved towards the shaping station 14 along the second transfer path T2, extended according to an L-shaped configuration above the shaping station 14. More particularly, with a horizontal translation of the second carriage 29 along the second guide beam 28, the carcass sleeve 12 is removed from the support element 35 in the pick-up station F and carried above the shaping station 14. A subsequent descent of the second column 30 places the carcass sleeve 12 within the shaping station 14.

The carcass sleeve 12 is then engaged in the shaping station 14, in order to be shaped according to the toroidal configuration required for the purpose of coupling with the crown structure 7 subsequently obtained in the crown building area B.

The invention claimed is:

1. A process for building tyres for vehicle wheels, comprising:
   transferring carcass sleeves obtained in a sleeve building area to a shaping station, wherein each carcass sleeve is shaped according to a toroidal configuration in order to be associated with a respective crown structure obtained in a crown building area, and
   wherein transferring comprises:
      transiting carcass sleeves through a storage device configured to receive a plurality of the carcass sleeves,
      wherein each carcass sleeve is picked-up from the sleeve building area before being carried to the shaping station, and the storage device comprises a load station, a pick-up station, one or more support elements, and a tower defining the rotation center (Y) along a vertical axis, with the load station and the pick-up station angled from one another around the rotation center (Y),
      wherein each carcass sleeve is engaged with the storage device by inserting at least one of the one or more support elements in the carcass sleeve.

2. The process as claimed in claim 1, wherein insertion of the one or more support elements is preceded by an action of alignment of the carcass sleeve with a geometric axis thereof substantially aligned with the one or more support elements.

3. The process as claimed in claim 1, wherein inserting the one or more support elements is executed by longitudinally translating the one or more support elements parallel to a geometric axis of the carcass sleeve.

4. The process as claimed in claim 1, wherein each carcass sleeve picked up from the sleeve building area is moved toward the storage device along a first transfer path lying in a vertical plane.

5. The process as claimed in claim 4, wherein the lying plane of the first transfer path is aligned with the load station of the storage device.

6. The process as claimed in claim 4, wherein each carcass sleeve is picked up from the storage device and moved toward the shaping station along a second transfer path lying in a vertical plane.

7. The process as claimed in claim 6, wherein the lying plane of the second transfer path is aligned with the pick-up station of the storage device.

8. The process as claimed in claim 6, wherein the lying planes of the first transfer path and second transfer path are respectively orthogonal.

9. The process as claimed in claim 5, wherein the second transfer path is extended substantially according to an L-shaped configuration above the shaping station.

10. The process as claimed in claim 4, wherein the first transfer path is extended substantially astride a service area configured for use by an operator.

11. The process as claimed in claim 10, wherein said storage device has at least one manual loading station accessible from said service area.

12. A process for building tyres for vehicle wheels, comprising:
    transferring carcass sleeves obtained in a sleeve building area to a shaping station,
    wherein each carcass sleeve is shaped according to a toroidal configuration in order to be associated with a respective crown structure obtained in a crown building area,
    wherein each carcass sleeve picked up from the sleeve building area, before being carried to the shaping station, transits through a storage device configured to receive a plurality of said carcass sleeves,
    wherein the storage device comprises a load station, a pick-up station, one or more support elements, and a tower defining a rotation center (Y) along a vertical axis, the load station and the pick-up station are angled from one another around the rotation center, and each carcass sleeve is engaged with the storage device by inserting at least one of the one or more support elements into the carcass sleeve;
    wherein each carcass sleeve picked up from the sleeve building area is moved toward the storage device along a first transfer path lying in a vertical plane; and
    wherein each carcass sleeve picked up from the sleeve building area, before moving along the first transfer path, is translated from an outlet station to an alignment position respectively offset along a direction orthogonal to the lying plane of the first transfer path.

13. The process as claimed in claim 1, wherein each carcass sleeve picked up from the sleeve building area is supported by an action of radial containment distributed over an external surface thereof.

14. The process as claimed in claim 1, wherein each carcass sleeve picked up from the storage device is supported by an action of radial containment distributed over an external surface thereof.

15. The process as claimed in claim 1, wherein, in the shaping station, a forming drum is internally coupled to each shaped carcass sleeve.

16. The process as claimed in claim 6, wherein each carcass sleeve is coupled to a forming drum, is picked up from the shaping station, and transferred into the crown building area in order to obtain said crown structure.

* * * * *